US007933110B2

(12) United States Patent
Takahashi et al.

(10) Patent No.: US 7,933,110 B2
(45) Date of Patent: Apr. 26, 2011

(54) POWER CONTROL DEVICE AND IMAGE FORMING APPARATUS

(75) Inventors: Tsunehide Takahashi, Tokyo (JP); Naoki Sato, Kanagawa (JP); Hideo Kikuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 479 days.

(21) Appl. No.: 12/045,432

(22) Filed: Mar. 10, 2008

(65) Prior Publication Data

US 2008/0225459 A1 Sep. 18, 2008

(30) Foreign Application Priority Data

Mar. 13, 2007 (JP) ................................. 2007-064194
Jan. 11, 2008 (JP) ................................. 2008-004019

(51) Int. Cl.
*H01H 47/32* (2006.01)
*H02H 9/02* (2006.01)

(52) U.S. Cl. ......................... 361/187; 361/190; 361/160

(58) Field of Classification Search .................. 361/187, 361/190, 160
See application file for complete search history.

(56) References Cited

U.S. PATENT DOCUMENTS

| | | | | |
|---|---|---|---|---|
| 3,610,703 | A * | 10/1971 | Slavin et al. | 303/159 |
| 3,775,666 | A * | 11/1973 | Smith | 322/28 |
| 4,959,687 | A | 9/1990 | Katoh et al. | |
| 4,978,898 | A * | 12/1990 | Tsukahara et al. | 318/280 |
| 6,429,623 | B2 * | 8/2002 | Hanada | 320/116 |
| 2006/0285867 | A1 | 12/2006 | Takahashi et al. | |

FOREIGN PATENT DOCUMENTS

| | | |
|---|---|---|
| JP | 11-109785 | 4/1999 |
| JP | 2003-47148 | 2/2003 |
| JP | 2005-221773 | 8/2005 |
| JP | 2006-58520 | 3/2006 |

* cited by examiner

*Primary Examiner* — Stephen W Jackson
*Assistant Examiner* — Zeev Kitov
(74) *Attorney, Agent, or Firm* — Oblon, Spivak, McClelland, Maier & Neustadt, L.L.P.

(57) ABSTRACT

A first switching unit and a second switching unit are connected in series to an electric power load. A voltage supply unit, which is connected between the first switching unit and the second switching unit, supplies a voltage to the second switching unit. A determining unit determines an occurrence of a malfunction in at least one of the first switching unit and the second switching unit.

18 Claims, 7 Drawing Sheets

POWER CONTROL DEVICE AND IMAGE FORMING APPARATUS

CROSS-REFERENCE TO RELATED APPLICATIONS

The present application claims priority to and incorporates by reference the entire contents of Japanese priority documents 2007-064194 filed in Japan on Mar. 13, 2007 and 2008-004019 filed in Japan on Jan. 11, 2008.

BACKGROUND OF THE INVENTION

1. Field of the Invention

The present invention relates to a power control device and an image forming apparatus employing the power control device.

2. Description of the Related Art

A power supply unit (circuit) supplies power from a capacitor or a charger to a fixing heater of an image forming apparatus. The power supply unit includes a semiconductor device (discharge transistor) that controls on (close)/off (open) of power and a relay as a safety device connected in series to the semiconductor device, both of which serve as a power control device (circuit).

The relay is controlled so that a contact thereof is turned on/off when the semiconductor device is off, and therefore, a current to the heater is not directly turned on/off at the contact of the relay. For this reason, a compact relay for a small current can be used as the safety device.

However, because the semiconductor device controls on/off of a large current, there may be a case where switching on/off occurs at the contact of the relay caused by a failure or a malfunction of the semiconductor device. As a result, a problem such as soldering of the contact of the relay may occur.

If the contact of the relay is soldered, a safety circuit does not operate normally, and a fixing unit is thereby heated to more than a predetermined temperature. In this case, a thermal fuse blows, and this prevents occurrence of an event such as emission of smoke or fire, however, there occur some problems that rollers of a fixing unit are degraded and replacement thereof is needed.

To solve the problems, for example, Japanese Patent Application Laid-open No. 2005-221773 discloses a method of detecting soldering of a contact of a relay or detecting either a malfunction of a relay or a short-circuit failure of a semiconductor device based on the following configuration. The configuration is such that a series circuit that includes the relay and the semiconductor device is connected to a fixing heater in an image forming apparatus to control power supply from a capacitor to the fixing heater. More specifically, the series circuit, formed of the relay and the semiconductor device that turns on/off power supply from the capacitor to the fixing heater, is provided with a unit of detecting two modes such as detecting a soldering failure of the contact of the relay and detecting an open-circuit failure of the contact of the relay or a short-circuit failure of the semiconductor device.

However, in the conventional technology disclosed in Japanese Patent Application Laid-open No. 2005-221773, it is quite impossible to find out whether the cause of the problem is the open-circuit failure of the contact of the relay or the short-circuit failure of the semiconductor device. Moreover, in the conventional technology disclosed in Japanese Patent Application Laid-open No. 2005-221773, it is impossible to detect the open-circuit failure of the semiconductor device.

SUMMARY OF THE INVENTION

It is an object of the present invention to at least partially solve the problems in the conventional technology.

According to an aspect of the present invention, there is provided a power control device including a first switching unit and a second switching unit connected in series to an electric power load; a voltage supply unit that is connected between the first switching unit and the second switching unit and that supplies a voltage to the second switching unit; and a determining unit that determines an occurrence of a malfunction in at least one of the first switching unit and the second switching unit.

Furthermore, according to another aspect of the present invention, there is provided an image forming apparatus including a power control device that includes a first switching unit and a second switching unit connected in series to an electric power load, a voltage supply unit that is connected between the first switching unit and the second switching unit and that supplies a voltage to the second switching unit, and a determining unit that determines an occurrence of a malfunction in at least one of the first switching unit and the second switching unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. A power control device that controls power for a fixing unit of a digital copier is explained below in the embodiments. Furthermore, examples of applying an image forming apparatus according to the present invention to the digital copier are shown in the embodiments, however, the examples are not limited by the digital copier. Thus, the image forming apparatus can be applied to a printer, a facsimile, or the like.

Figure 1:
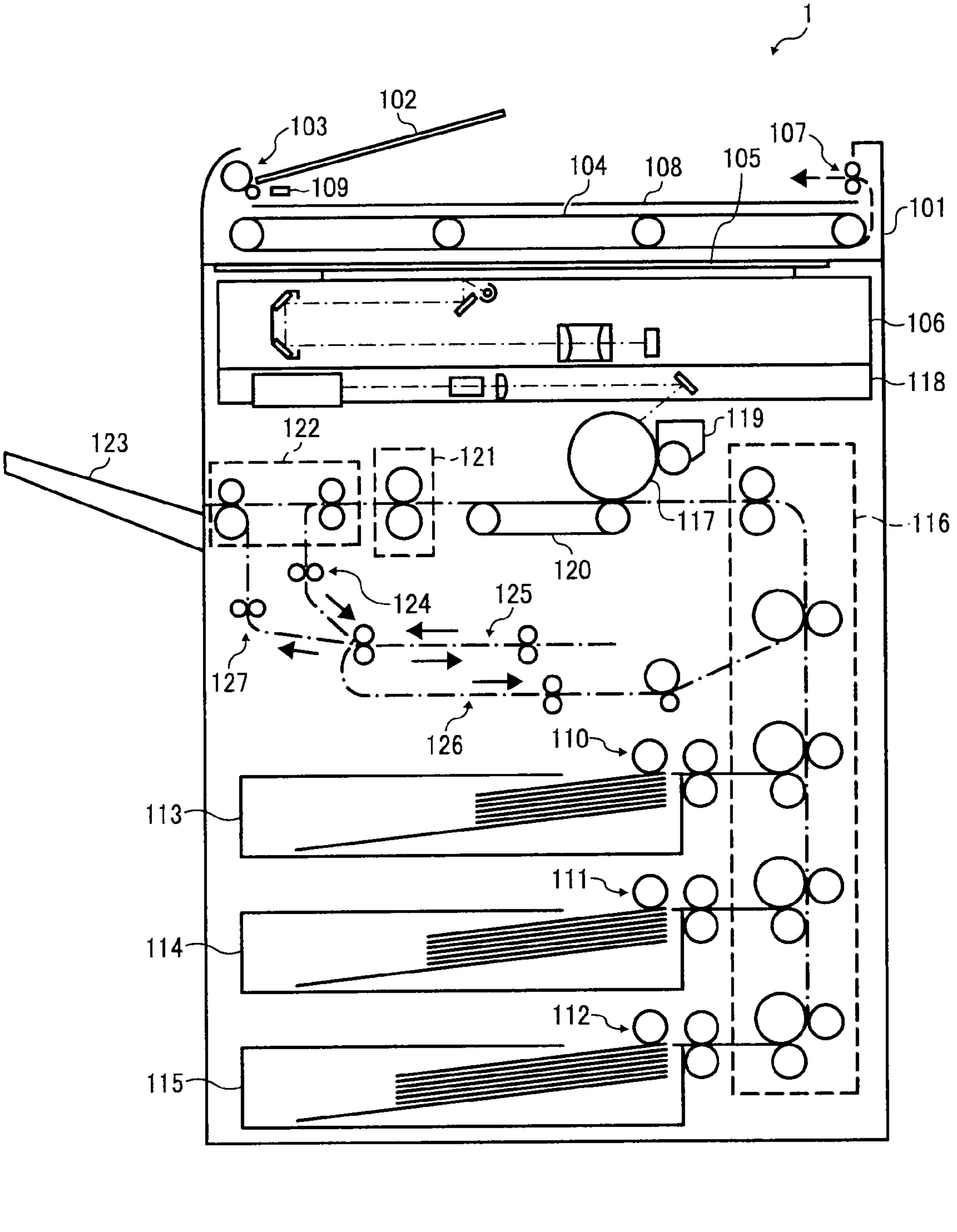
FIG. 1 is a vertical cross section of a digital copier according to a first embodiment of the present invention.

FIG. 1 is a vertical cross section of a digital copier 1 according to a first embodiment of the present invention. The digital copier 1 is a multifunction product (MFP). More specifically, the digital copier 1 includes a copier function and other functions such as a printer function and a facsimile function. By operating an application switching key on an operating unit (not shown), the copier function, the printer function, and the facsimile function can be sequentially switched to select any one of the functions. With this feature, selecting the copier function allows a copy mode to be set, selecting the printer function allows a print mode to be set, and selecting the facsimile function allows a facsimile mode to be set.

A schematic configuration of the digital copier 1 and an operation thereof in the copy mode are explained below. As shown in FIG. 1, in an automatic document feeder (ADF) 101, when a start key on the operating unit (not shown) is pressed, a document set with its image side upward on a document mount 102 is fed by a paper feed roller 103 and a paper feed belt 104 to a fixed position on the document mount 102 formed of a contact glass. The ADF 101 includes a count function of counting the number of documents each time feeding of a sheet of document is completed. The document on a contact glass 105 is read by an image reader 106 to obtain image information for the document, and the document is discharged onto a paper discharge base 108 by the paper feed belt 104 and a discharge roller 107.

If a document set detector 109 detects that a next document is present on the document mount 102, a lowest document on the document mount 102 is also fed to the fixed position on the contact glass 105 by the paper feed roller 103 and the paper feed belt 104. The document on the contact glass 105 is read by the image reader 106 to obtain image data for the document, and then document is discharged onto the paper discharge base 108 by the paper feed belt 104 and the discharge roller 107. The paper feed roller 103, the paper feed belt 104, and the discharge roller 107 are driven by a conveying motor.

Any paper feed device selected from among a first paper feed device 110, a second paper feed device 111, and a third paper feed device 112 feeds a paper loaded thereon. The paper is conveyed by a vertical conveying unit 116 up to a position where the paper comes in contact with a photosensitive element 117. The photosensitive element 117 employs, for example, a photosensitive drum, and is configured to rotate by a main motor (not shown).

The image data read from the document by the image reader 106 is subjected to predetermined image processing by an image processor (not shown), and is converted to optical information by a writing unit 118. The photosensitive drum 117 is uniformly charged by a charger (not shown), and the charged photosensitive drum 117 is exposed with the optical information from the writing unit 118 and an electrostatic latent image is formed thereon. The electrostatic latent image on the photosensitive drum 117 is developed by a developing unit 119 to form a toner image thereon. The writing unit 118, the photosensitive drum 117, the developing unit 119, and other known peripheral devices (not shown) around the photosensitive drum 117 constitute a printer engine that forms an image on a medium such as a sheet of paper by using an electrophotographic method.

A conveyor belt 120 serves as a unit for paper conveyance and also as a unit for image transfer, and is applied with transfer bias from a power supply. The conveyor belt 120 transfers the toner image on the photosensitive drum 117 to a paper while conveying the paper from the vertical conveying unit 116 at a speed equal to that of the photosensitive drum 117. A fixing unit 121 fixes the toner image on the paper, and a paper discharge unit 122 discharges the paper onto a paper discharge tray 123. After the toner image is transferred, toner remaining on the photosensitive drum 117 is cleaned by a cleaning device (not shown).

The operation so far is performed when an image is copied on one side of the paper in a normal copy mode. If images are copied on both sides of the paper in a duplex copy mode, a paper is fed from any one of paper feed trays 113 to 115, an image is formed on a first surface of the paper in the above manner. The paper discharge unit 122 does not switch to the side of the paper discharge tray 123 but switches to a paper conveying path 124 for duplex printing. The paper is switched back to be reversed by a reversing unit 125, and is conveyed to a duplex conveying unit 126.

The duplex conveying unit 126 conveys the paper to the vertical conveying unit 116, and the vertical conveying unit 116 further conveys the paper to a position where the paper comes in contact with the photosensitive drum 117. A toner image also formed on the photosensitive drum 117 in the above manner is transferred to a second surface of the paper, and the toner image is fixed on the paper by the fixing unit 121 to obtain a double-sided copied paper. The double-sided copied paper is discharged to the paper discharge tray 123 by the paper discharge unit 122.

If the paper is to be reversely discharged, the reversing unit 125 switches back the paper and reverses it. The reversed paper is conveyed not to the duplex conveying unit 126 but is conveyed to a reversely-discharged-paper conveying path 127, and is discharged to the paper discharge tray 123 by the paper discharge unit 122.

In the print mode, instead of the image data obtained from the image processor, image data sent from an external device is input to the writing unit 118, and an image is formed on the paper in the above manner.

Furthermore, in the facsimile mode, a facsimile transmitter/receiver (not shown) transmits image data obtained from the image reader 106 to the other party and receives image data from the other party. And then, the facsimile transmitter/receiver inputs the received image data to the writing unit 118 instead of the image data from the image processor, and an image is formed on the paper in the above manner.

The digital copier 1 includes a large-capacity paper feeder, a finisher, and the operating unit, which are not shown. More specifically, the finisher performs sorting, punching, and stapling on sheets of copied paper. The operating unit has functions of setting a mode to read a document, a magnification of copying, a paper feed stage, and any post-process by the finisher, and displays the operations set thereon for an operator.

Figure 2:
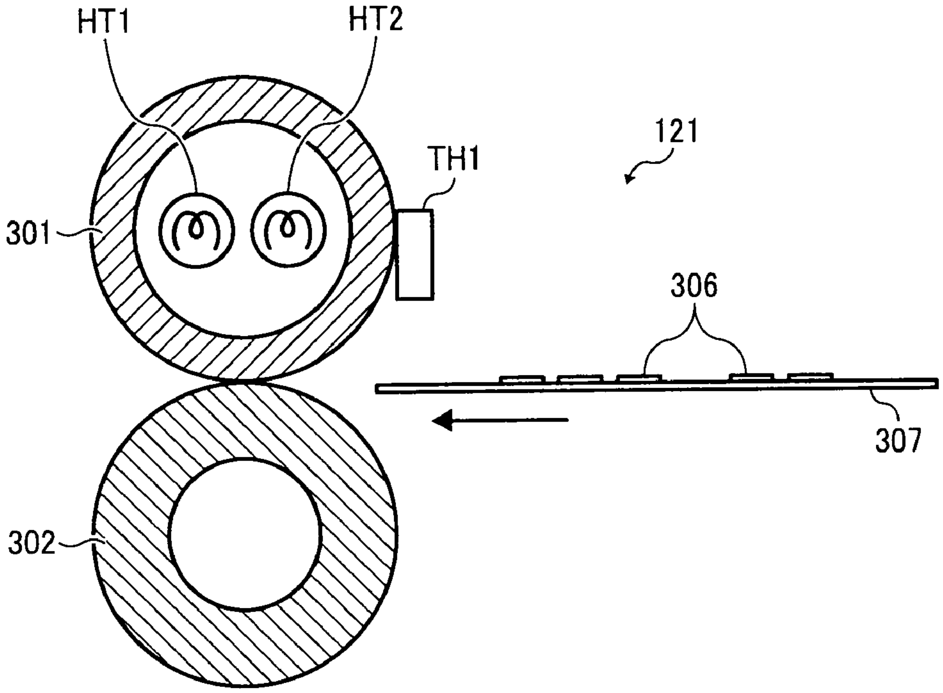
FIG. 2 is a schematic of a fixing unit used in the digital copier.

FIG. 2 is a schematic of the fixing unit 121 used in the digital copier 1. The fixing unit 121 implements a heating device and the fixing unit according to the present invention. The fixing unit 121 includes a fixing roller 301 that is a target to be heated, and a pressing roller 302 that is formed of an elastic material such as silicone rubber and is pressed against the fixing roller 301 with a predetermined pressure force by a pressing unit (not shown). A fixing material and a pressing material are generally formed as a roller, but either one of or both of the materials may be formed into an endless belt. A fixing heater HT1 and a fixing heater HT2 are provided in arbitrary locations of the fixing unit 121. For example, the fixing heaters HT1 and HT2 are arranged inside the fixing roller 301 so as to heat the fixing roller 301, or the roller to be heated, from the inside thereof.

A drive mechanism (not shown) rotates the fixing roller 301 and the pressing roller 302. A temperature sensor TH1 such as a thermistor is in contact with the surface of the fixing roller 301 to detect a temperature (fixing temperature) of the surface of the fixing roller 301. A sheet 307 is a medium such as a paper that carries a toner 306 thereon. When passing through a nip part between the fixing roller 301 and the pressing roller 302, the sheet 307 is heated and pressed by the fixing roller 301 and the pressing roller 302, and the toner 306 is thereby fixed as an image on the sheet 307.

The fixing heater HT1 as a first heating unit is a main heater that is turned on when the temperature of the fixing roller 301 does not reach a predetermined target temperature Tt as a reference, and heats the fixing roller 301. The fixing heater HT2 as a second heating unit is an auxiliary heater that is turned on when a main power supply to the digital copier 1 is turned on or upon a rising period from returning from a power saving mode, explained later, to being ready for copying. In other words, the fixing heater HT2 is turned on when the fixing unit 121 is warmed up, and heats the fixing roller 301.

Figure 3:
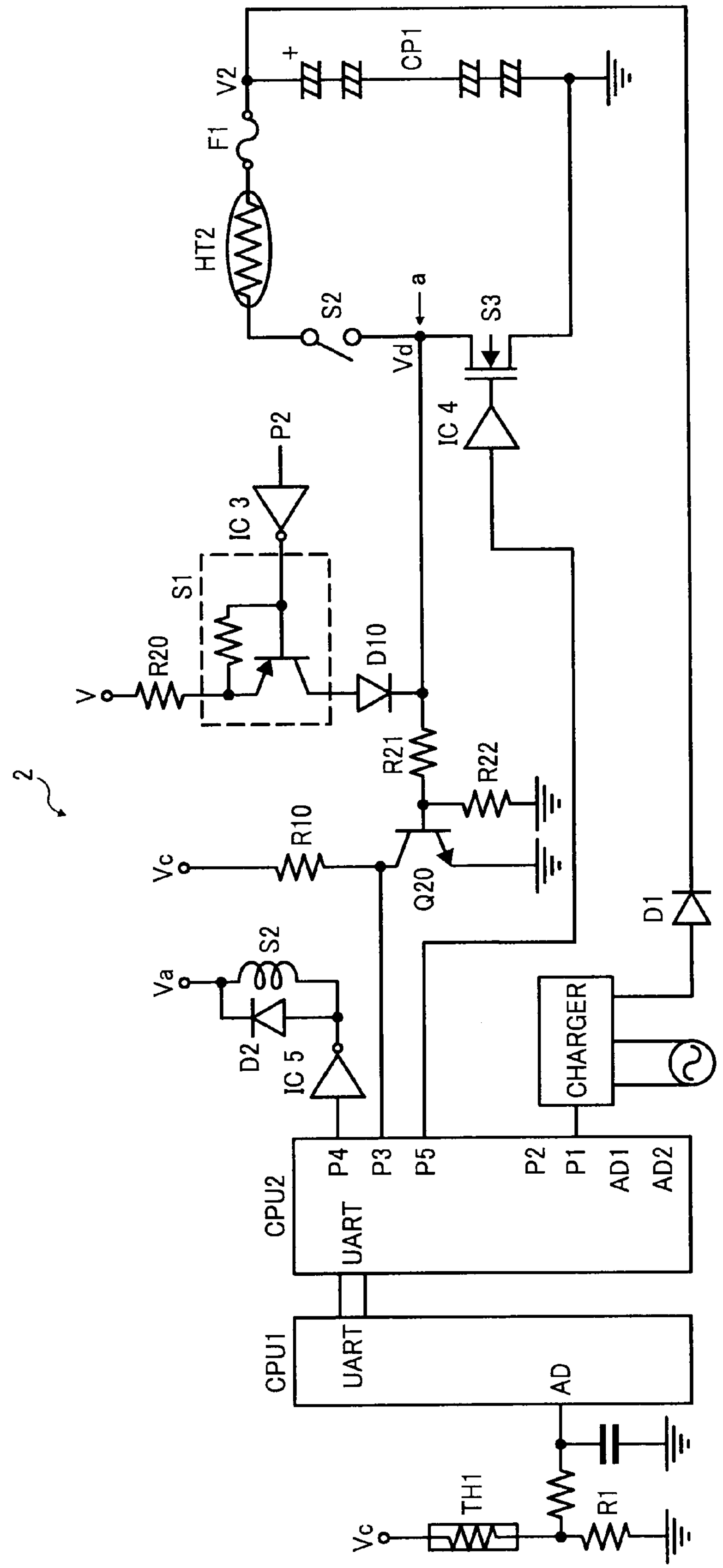
FIG. 3 is a circuit diagram of a power control device according to the first embodiment.

FIG. 3 is a circuit diagram of a power control device 2 according to the first embodiment. The power control device 2 controls power supply to the fixing heater HT2 to reduce the rise time of the fixing heater HT2 and prevent temperature drop of the fixing heater HT2 during continuous paper passing through the fixing unit 121. The power control device 2 uses an electric double-layer capacitor CP1 as a capacitor.

The electric double-layer capacitor CP1 has a cathode connected to ground (GND) and an anode connected to a charger via a diode D1, and controls charging to the charger by a signal sent from an output port P1 of a CPU 2. The output of the electric double-layer capacitor CP1 is connected to one end of the fixing heater HT2 (right side thereof in FIG. 3) via a thermal fuse F1. The other end of the fixing heater HT2 (left side thereof in FIG. 3) is connected to the drain of the discharge transistor S3 which is an field effect transistor (FET), via a junction "a" between the relay S2 and the discharge transistor S3. The source of the discharge transistor S3 is connected to the cathode of the electric double-layer capacitor CP1.

The thermal fuse F1 is provided near the fixing roller 301, and is set so as to blow at a predetermined temperature upon occurrence of any malfunction and stop energizing the fixing heater HT2.

Arranged near the fixing roller 301 is the thermistor TH1 of which one end (upper side thereof in FIG. 3) is pulled up to voltage Vc. Connected to the other end of the thermistor TH1 (lower side thereof in FIG. 3) is one end of a resistor R1 (upper side thereof in FIG. 3) of which the other end (lower side thereof in FIG. 3) is connected to GND. A junction between the thermistor TH1 and the resistor R1 is connected to an analog-to-digital (A/D) conversion terminal AD of a CPU 1 via an integrating circuit. Temperature is obtained by a change in voltage and so the voltage is input to the A/D conversion terminal AD. When the temperature detected by the thermistor TH1 is larger than a predetermined value, this indicates that there is some malfunction. Thus, the CPU 1 instructs the CPU 2 through a communication port UART so as to open the contact of the relay S2.

The coil of the relay S2 of which one end (upper side thereof in FIG. 3) is pulled up to voltage Va is connected to an output port P4 of the CPU 2 via a driver IC 5, and the drive of the coil of the relay S2 is turned off (opened) upon malfunction by the instruction from the communication port UART, to open the contact. Consequently, the energization to the fixing heater HT2 is stopped. A diode D2 is used to prevent breakage of the driver IC 5 by circulating induced electromotive force produced when the driver IC 5 changes its output from a high (H) logic level to a low (L) logic level.

Generally, it is determined whether the CPU 2 turns on the fixing heater HT2 based on a detected value of a fixing temperature (value input to the A/D conversion terminal AD) and a value of a target temperature in a state where the contact of the relay S2 is on (close). And a signal is applied to the gate of the discharge transistor S3 via a driver IC 4 from an output port P5 of the CPU 2, to turn on (close)/off (open) the discharge transistor S3. The fixing roller 301 is controlled to a predetermined temperature through the on/off operation of the discharge transistor S3.

The FET is used as the discharge transistor S3 in the first embodiment, however, an insulated gate bipolar transistor (IGBT) may be used instead of the FET. When the IGBT is used, the drain of the FET corresponds to the collector of the IGBT, and the source of the FET corresponds to the emitter of the IGBT. The thermistor TH1 may use any other temperature detector, for example, a thermopile.

Assume that the fixing heater is a halogen heater with rating of 200 watts and that a charged voltage (output voltage) V2 of the electric double-layer capacitor CP1 is 45 volts. A resistance of the halogen heater is about 10Ω at the time of rated operation and is about 1Ω at the time of being cold. Therefore, when the halogen heater is turned on while being cold, a large current such as 45V/1Ω=45 A flows based on Ohm's law, and a current of about 4 amperes flows upon the rated operation. To directly open/close a large current circuit of 45 amperes at the contact of the relay S2, a large-sized and high-cost circuit which supports a large current has to be used.

However, because the 45-ampere current flows momentarily, there is no problem in momentary flow of the large current of 45 amperes when the contact of the relay S2 is closed.

Therefore, by controlling the contact of the relay S2 so as to be surely turned on/off in the non-energized state, a compact and low-cost relay can be used. To use this relay, before the relay S2 is turned on/off, it is necessary to check that a short-circuit failure does not occur in the discharge transistor S3 that controls energization to the fixing heater HT2. Therefore, if the following conditions are satisfied, it is possible to determine whether a short-circuit failure or an open-circuit failure occurs in the discharge transistor S3. More specifically, the conditions are such that the contact of the relay S2 is turned off, the discharge transistor S3 is set to an off (open) mode or an output of the output port P5 of the CPU 2 is set to the L logic level, a bias voltage is applied to the drain of the discharge transistor S3 in that state, and a drain voltage Vd can be detected.

In the power control device 2, a bias voltage is taken from the power supply thereof and is applied to the drain of the discharge transistor S3 through a circuit formed of a resistor R20, a bias transistor S1 which is a resistor-built-in PNP bipolar transistor, and a diode D10.

The bias transistor S1 is connected to an output port P2 of the CPU 2 via a driver IC 3, to be on/off as required. The drain of the discharge transistor S3 is connected to the base of a transistor Q20 which is an NPN bipolar transistor of which emitter is connected to GND via a resistor R21, and the base of the transistor Q20 is connected to GND via a resistor R22. The voltage is changed by the resistor R21 and the resistor R22, and when a drain voltage Vd reaches a predetermined value, the transistor Q20 is turned on. The collector of the transistor Q20 is pulled up to voltage Vc through a resistor R10, is connected to an input port P3 of the CPU 2, and is recognized as a binary value of the H logic level and the L logic level by a logic circuit in the CPU 2.

Figure 4:
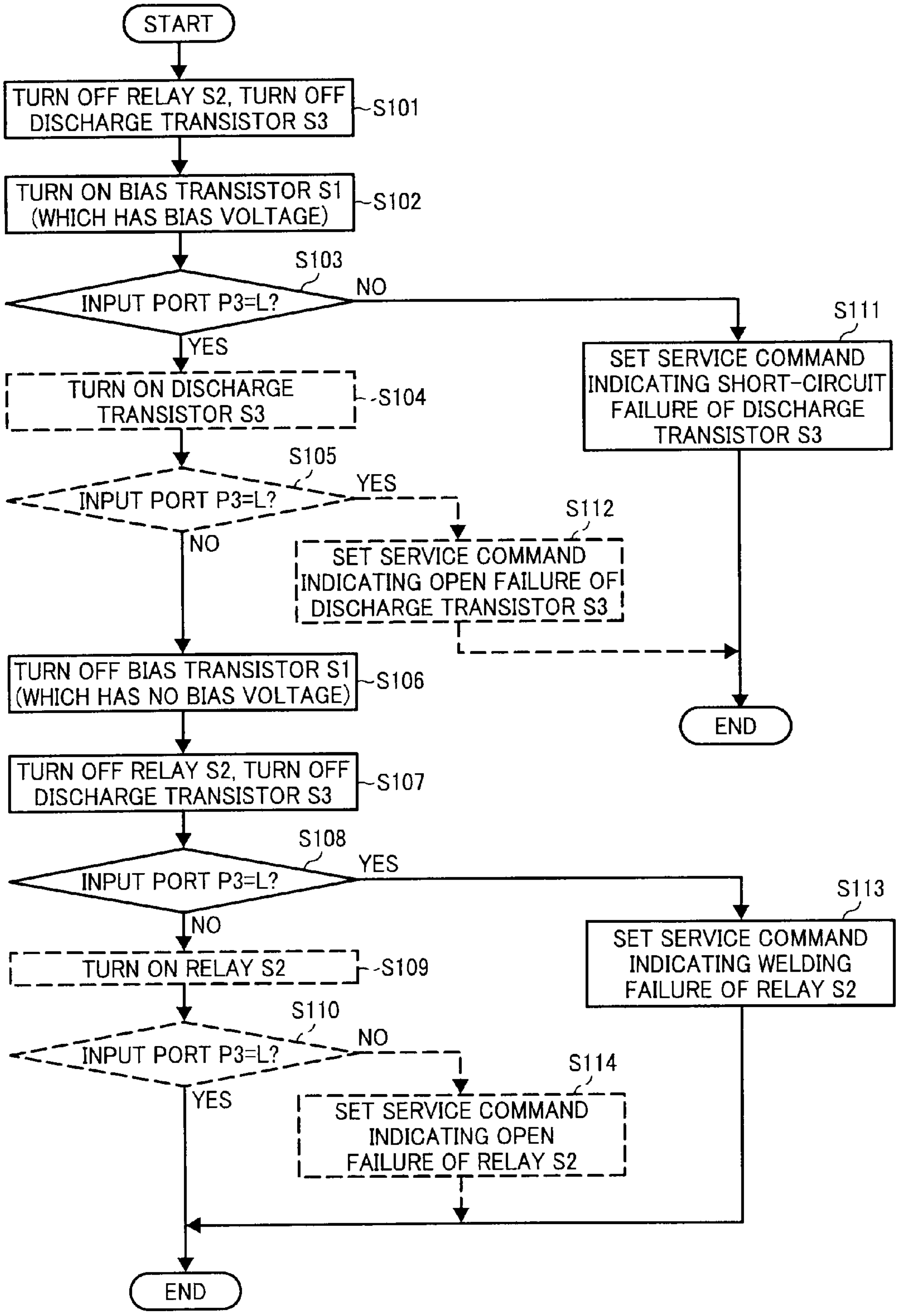
FIG. 4 is a flowchart of a method of determining the quality of a relay and a discharge transistor.

A method of determining the quality of the relay S2 and the discharge transistor S3 by the power control device 2 is explained below. FIG. 4 is a flowchart of the method of determining the quality of the relay S2 and the discharge transistor S3.

At first, the contact of the relay S2 and the discharge transistor S3 for electrical discharge are turned off (opened) (Step S101). Next, the bias transistor S1 that applies a bias voltage to the drain of the discharge transistor S3 is turned on (closed) (Step S102).

When the discharge transistor S3 is normally off in this state, the current from the bias transistor S1 does not flow to the discharge transistor S3, but flows to the base of the transistor Q20. Consequently, the current flows between the emitter and the collector of the transistor Q20, and the voltage at the input port P3 thereby decreases (actually, the logic level changes from high to low).

However, when the discharge transistor S3 is not normally off, or is short-circuited (on), the current from the bias transistor S1 flows to the discharge transistor S3, but does not flow to the base of the transistor Q20. Consequently, the current does not flow between the emitter and the collector of the transistor Q20, and thus the voltage at the input port P3 does not change (actually, the logic level remains high).

It is also considered that the contact of the relay S2 may be short-circuited, however, because the bias voltage is applied to the drain of the discharge transistor S3, there is no need to consider the short circuit in the contact of the relay S2 at this time.

The CPU 2 determines whether the input port P3 has the L logic level (Step S103). When it is determined that the input port P3 has not the L logic level, or has the H logic level (NO at Step S103), the CPU 2 determines that a short-circuit failure occurs in the discharge transistor S3, sets a service command SC to that effect (Step S111), and ends the quality determination.

When it is determined that the input port P3 has the L logic level (YES at Step S103), the CPU 2 determines that no short-circuit failure occurs in the discharge transistor S3.

Next, the discharge transistor S3 is turned on (Step S104).

When the discharge transistor S3 is normally on in this state, the current from the bias transistor S1 flows to the discharge transistor S3, but does not flow to the base of the transistor Q20. Consequently, the current does not flow between the emitter and the collector of the transistor Q20, and thus the voltage at the input port P3 increases (actually, the logic level changes from low to high).

However, when the discharge transistor S3 is not normally on, or is open (off), the current from the bias transistor S1 does not flow to the discharge transistor S3, but flows to the base of the transistor Q20 and remains therein. Consequently, the current flows between the emitter and the collector of the transistor Q20, and thus the voltage at the input port P3 remains decreased (actually, the logic level remains low).

It is also considered that the contact of the relay S2 may be short-circuited, however, the bias voltage is applied to the drain of the discharge transistor S3, and thus, there is no need to consider the short circuit in the contact of the relay S2 at this time.

The CPU 2 further determines whether the input port P3 has the L logic level (Step S105). When it is determined that the input port P3 has the L logic level (YES at Step S105), the CPU 2 determines that an open-circuit failure occurs in the discharge transistor S3, sets a service command to that effect (Step S112), and ends the quality determination.

When it is determined that the input port P3 has not the L logic level, or has the H logic level (NO at Step S105), the CPU 2 determines that the open-circuit failure does not occur in the discharge transistor S3.

However, it is secure enough to determine afterward whether the open-circuit failure occurs in the discharge transistor S3 by detecting malfunction in the flow of fixing-temperature control, and because of this, Steps S104, S105, and S112 may be omitted.

It is confirmed that there is no short circuit of the discharge transistor S3 in the flow so far. Next, the bias transistor S1 is turned off (Step S106), and further the contact of the relay S2 and the discharge transistor S3 are turned off (Step S107).

When the contact of the relay S2 is normally off in this state, the current from the electric double-layer capacitor CP1 does not flow to the base of the transistor Q20. Consequently, the current does not flow between the emitter and the collector of the transistor Q20, and the voltage at the input port P3 does not thereby change (actually, the logic level remains high).

However, when the contact of the relay S2 is not normally off, or is soldered (on), the current from the electric double-layer capacitor CP1 flows to the base of the transistor Q20. Therefore, the current flows between the emitter and the collector of the transistor Q20, and thus the voltage at the input port P3 decreases (actually, the logic level changes from high to low).

The CPU 2 further determines whether the input port P3 has the L logic level (Step S108). When it is determined that the input port P3 has the L logic level (YES at Step S108), the CPU 2 determines that a soldering failure occurs in the contact of the relay S2, sets a service command SC to that effect (Step S113), and ends the quality determination.

When it is determined that the input port P3 has not the L logic level, or has the H logic level (NO at Step S108), the CPU 2 determines that the soldering failure does not occur in the contact of the relay S2.

Next, the contact of the relay S2 is turned on (Step S109).

When the contact of the relay S2 is normally on in this state, the current from the electric double-layer capacitor CP1 flows to the base of the transistor Q20. Consequently, the current flows between the emitter and the collector of the transistor Q20, and the voltage at the input port P3 thereby decreases (actually, the logic level changes from high to low).

However, when the contact of the relay S2 is not normally on, or is open (off), the current from the electric double-layer capacitor CP1 does not flow to the base of the transistor Q20. Therefore, the current does not flow between the emitter and the collector of the transistor Q20, and thus the voltage at the input port P3 does not change (actually, the logic level remains high).

The CPU 2 further determines whether the input port P3 has the L logic level (Step S110). When it is determined that the input port P3 has not the L logic level, or has the H logic level (NO at Step S110), the CPU 2 determines that an open-circuit failure occurs in the contact of the relay S2, sets a service command SC to that effect (Step S114), and ends the quality determination.

When it is determined that the input port P3 has the L logic level (YES at Step S110), the CPU 2 determines that the open-circuit failure does not occur in the contact of the relay S2. In this case, it is finally determined that the relay S2 and the discharge transistor S3 are good items.

However, it is secure enough to determine afterward whether the open-circuit failure occurs in the contact of the relay S2 by detecting malfunction in the flow of fixing-temperature control, and because of this, Steps S109, S110, and S114 may be omitted.

After the service commands SC are set, the corresponding processes are respectively executed. For example, if the service command SC is one indicating the short-circuit failure of the discharge transistor S3, the following processes are executed, such that turning on the contact of the relay S2 is inhibited and a message indicating the malfunction of the discharge transistor S3 is displayed on a display unit (not shown), or the message indicating the malfunction of the discharge transistor S3 is informed to a service section. Similarly, the required processes are performed on the other service commands SC, however, the processes are those generally performed in the digital copier, and thus explanation thereof is omitted.

Table 1 includes items as follows used in the method of determining the quality. More specifically, the items are combinations of on/off states of the bias transistor S1, the contact of the relay S2, and of the discharge transistor S3, the logic levels of the input port P3 of the CPU 2, and a correlation between the results of determination of the relay S2 and the discharge transistor S3. The method is implemented assuming that no failure may occur in the bias transistor S1 serving as a transistor for signals and in the transistor Q20.

TABLE 1

| On/Off state | | | | Results of determination | | |
|---|---|---|---|---|---|---|
| Bias transistor S1 | Relay S2 | Discharge transistor S3 | Logic level of input port P3 | Relay S2 | Discharge transistor S3 | Contents of failure |
| on | Off | Off | H | — | Short circuit | Determined S3 is short-circuited |
| | | | L | — | — | Determined as normal |
| on | Off | On | H | — | — | Determined as normal |
| | | | L | — | Open | Determined S3 is not turned on |
| off | Off | Off | H | — | — | Determined as normal |
| | | | L | Soldering | — | Determined S2 is soldered |
| off | On | Off | H | (Open) | (Short circuit) | Determined S2 is not turned on |
| | | | L | — | — | Determined as normal |

As explained above, in the power control device according to the first embodiment, a circuit formed of the bias transistor and the diode is arranged between the relay and the discharge transistor connected in series to the fixing heater, and the circuit can thereby apply or stop the bias voltage to the drain of the discharge transistor. Therefore, it is possible to check the change in voltage at a particular portion of the power control device when application/non-application of bias voltage, on/off of the contact of the relay, and on/off of the discharge transistor are combined with one another, respectively. The change in voltage allows accurate determination on malfunctions of the relay and the discharge transistor or on contents of the malfunctions. The contents include a soldering failure of the contact of the relay, an open-circuit failure of the contact of the relay, a short-circuit failure of the discharge transistor, and an open-circuit failure of the discharge transistor.

Furthermore, in the power control device according to the first embodiment, the level of the voltage is changed by the transistor and the change is detected by the input port, which makes it possible to determine malfunctions of the relay and the discharge transistor and the content thereof. Consequently, it is possible to simplify a quality determining circuit in the power control device, and also minimize the power control device and reduce its cost.

In the power control device according to the first embodiment, the bias voltage is taken from the power supply of the power control device, however, in a power control device according to a second embodiment, the bias voltage is taken from between a plurality of cells which is connected to each other in series and forms the electric double-layer capacitor.

The second embodiment is explained below with respect to the accompanying drawings. In the configuration of a digital copier according to the second embodiment, portions other than the power control device are the same as these of the digital copier according to the first embodiment, and thus the explanation thereof is omitted. As for the configuration of the power control device, a different point from that of the first embodiment is explained below. The rest of the configuration is the same as that of the first embodiment, and thus explanation thereof is omitted.

Figure 5:
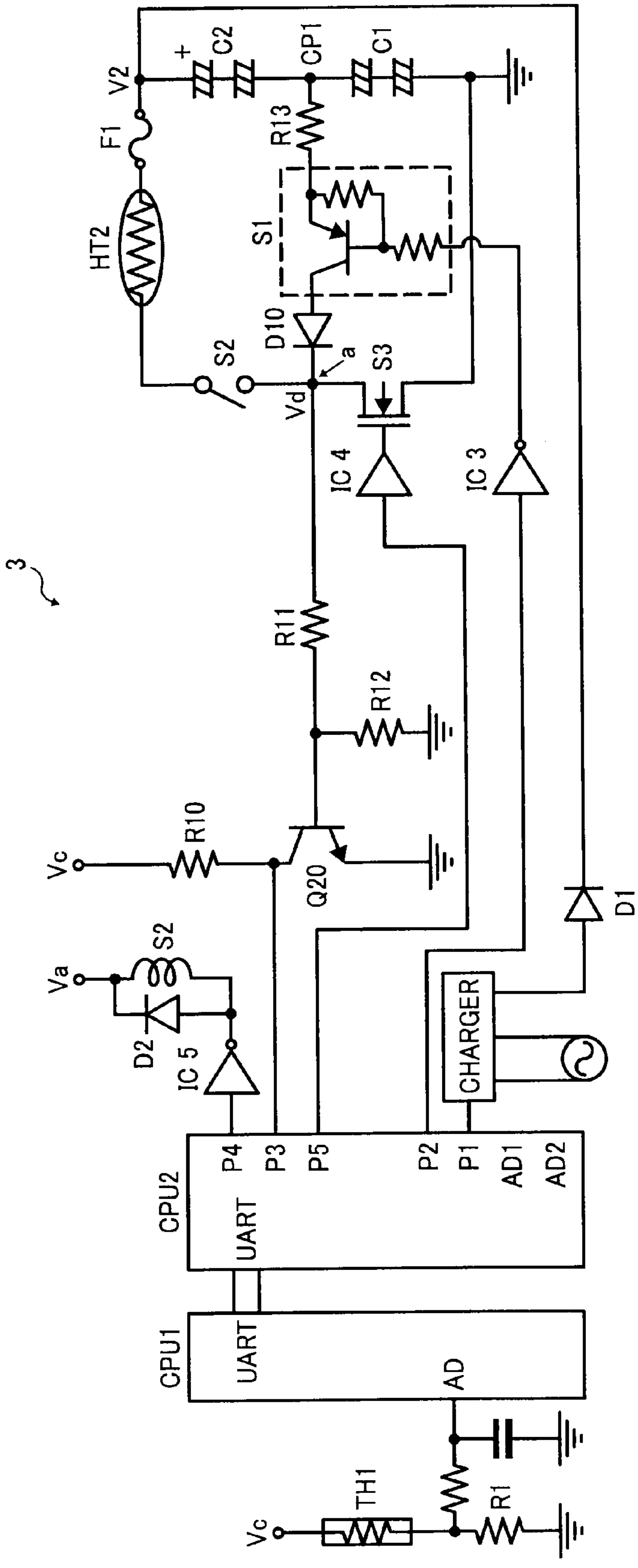
FIG. 5 is a circuit diagram of a power control device according to a second embodiment of the present invention.

FIG. 5 is a circuit diagram of the power control device according to the second embodiment. A power control device 3 uses the electric double-layer capacitor CP1 as a capacitor. The electric double-layer capacitor CP1 has a plurality of cells C1 and C2 connected in series. Connected to the junction between the cell C1 and the cell C2 is the emitter of the bias transistor S1 via a resistor R13, the collector of the bias transistor S1 is connected to the anode of the diode D10, and the cathode of the diode D10 is connected to the drain of the discharge transistor S3.

Therefore, in the power control device 3, a bias voltage is taken from between the cell C1 and the cell C2 of the electric double-layer capacitor CP1, and is applied to the drain of the discharge transistor S3 through a circuit formed of the resistor R13, the bias transistor S1, and the diode D10. As explained above, the voltage is taken from somewhere in the middle of the electric double-layer capacitor CP1 whose cathode is connected to GND, to form a low voltage circuit. Thus, a simple and low-cost circuit can be configured.

Similarly to the power control device according to the first embodiment, a signal from the output port P2 of the CPU 2 is input to the driver IC 3, an output signal of the driver IC 3 is input to the base of the bias transistor S1, and on/off of the bias transistor S1 is thereby controlled. The drain of the discharge transistor S3 is connected, via a resistor R11, to the base of the transistor Q20 which is an NPN bipolar transistor whose emitter is connected to GND, and the base of the transistor Q20 is connected to GND via a resistor R12. The voltage is changed by the resistor R11 and the resistor R12, and when the drain voltage Vd reaches a predetermined value, the transistor Q20 is turned on (closed). The collector of the transistor Q20 is pulled up to a voltage Vc through the resistor R10, is connected to the input port P3 of the CPU 2, and is recognized as a binary value of the H logic level and L logic level.

A method of determining the quality of the relay S2 and the discharge transistor S3 by the power control device 2 is the same as the flowchart of FIG. 4 explained in the first embodiment, and thus explanation thereof is omitted.

As explained above, in the power control device according to the second embodiment, the bias voltage applied to the drain of the discharge transistor can be taken from between the cells that constitute the electric double-layer capacitor. Thus, the quality determining circuit of the power control device can be simplified as a low voltage circuit, which allows minimization and low cost of the power control device.

In the power control device according to the second embodiment, the drain voltage Vd of the discharge transistor S3 is checked through the port of the CPU 2. However, in a power control device according to a third embodiment, the drain voltage Vd of the discharge transistor S3 is checked through AD conversion. Moreover, in the power control device according to the third embodiment, a determination voltage used to determine whether malfunctions occur in the relay S2 and the discharge transistor S3 is corrected based on the charged voltage of the electric double-layer capacitor.

The third embodiment is explained below with respect to the accompanying drawings. In the configuration of a digital copier according to the third embodiment, portions other than the power control device are the same as these of the digital copier according to the second embodiment, and thus the explanation thereof is omitted. As for the configuration of the power control device, a different point from that of the second embodiment is explained below. The rest of the configuration is the same as that of the second embodiment, and thus explanation thereof is omitted.

Figure 6:
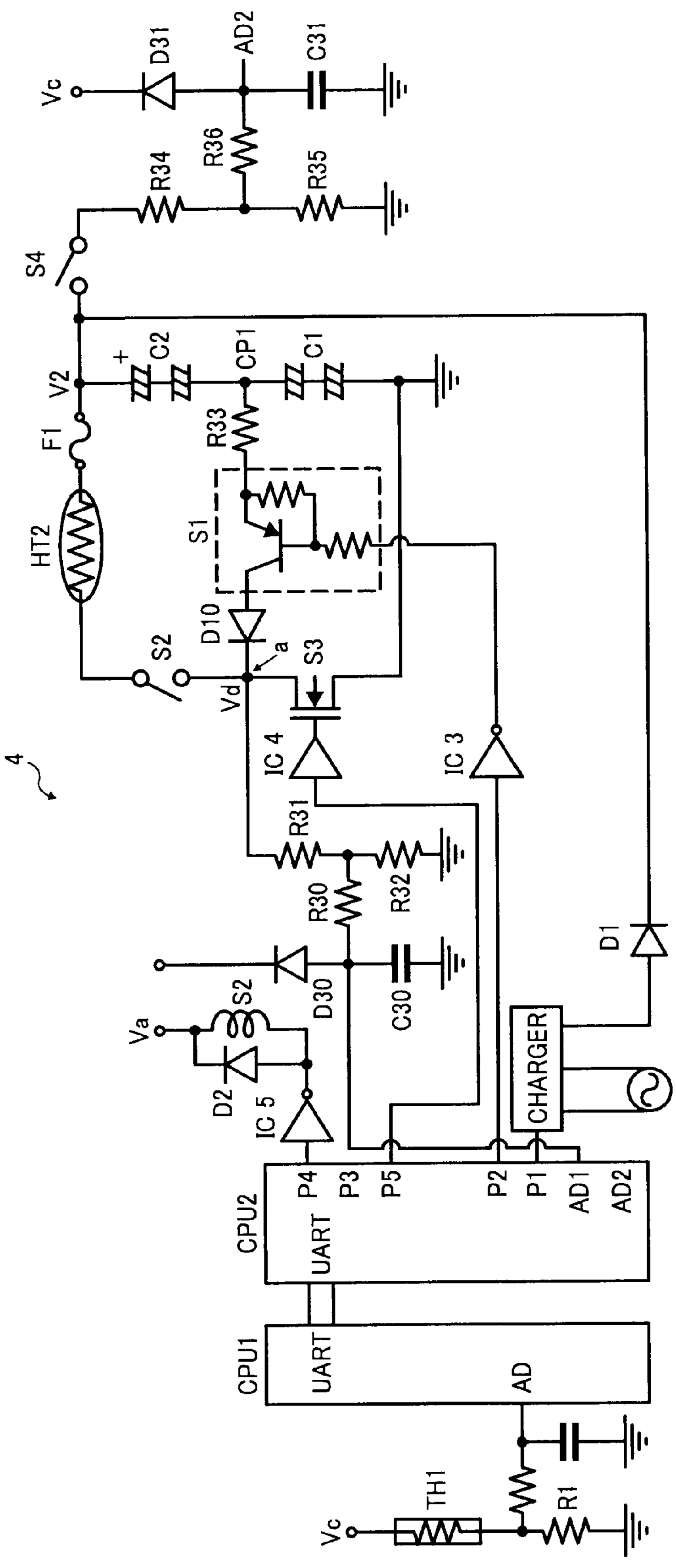
FIG. 6 is a circuit diagram of a power control device according to a third embodiment of the present invention.

FIG. 6 is a circuit diagram of the power control device according to the third embodiment. Similarly to the power control device 3 according to the second embodiment, a power control device 4 is configured to take the bias voltage for the discharge transistor S3 from between the cell C1 and the cell C2 of the electric double-layer capacitor CP1.

However, the power control device 4 does not include the resistors R10, R11, R12, and the transistor Q20 which are provided in the power control device 3. Instead of these, the drain voltage Vd of the discharge transistor S3 is changed by resistors R31 and R32 connected in series, and is connected to an A/D conversion input AD1 of the CPU 2 via a filter formed of a resistor R30 and a capacitor C30. The A/D conversion input AD1 is connected to a power supply of an A/D conversion circuit through a diode D30 and is thereby protected from excessive voltage.

There is a circuit that is formed of resistors R34 and R35 and of a filter including a resistor R36 and a capacitor C31 and that reads a charged voltage. A charged voltage (output voltage) V2 of the electric double-layer capacitor CP1 connected to the circuit via a switch S4 is converted into output voltage in the resistors R34 and R35 and is connected to an A/D conversion input AD2 of the CPU 2 via the filter. It is noted that the switch S4 is used to eliminate unnecessary electrical discharge in the circuit that reads the charged voltage. The A/D conversion input AD2 is connected to a power supply of the A/D conversion circuit through a diode D31 and is thereby protected from excessive voltage.

When the drain voltage Vd of the discharge transistor S3 is checked through the input port P3 of the CPU 2 as explained in the power control device 3 according to the second embodiment, there is limitation that the charged voltage (output voltage) V2 of the electric double-layer capacitor CP1 needs to be a predetermined value or more.

However, by using A/D conversion as is in the power control device 4 according to the third embodiment, it is possible to detect a charge state of the electric double-layer capacitor CP1, compare a value of the charged voltage (output voltage) V2 with the detected drain voltage Vd of the discharge transistor S3, and correct a determination voltage Vth used to determine whether malfunctions occur in the relay S2 and the discharge transistor S3.

Figure 7:
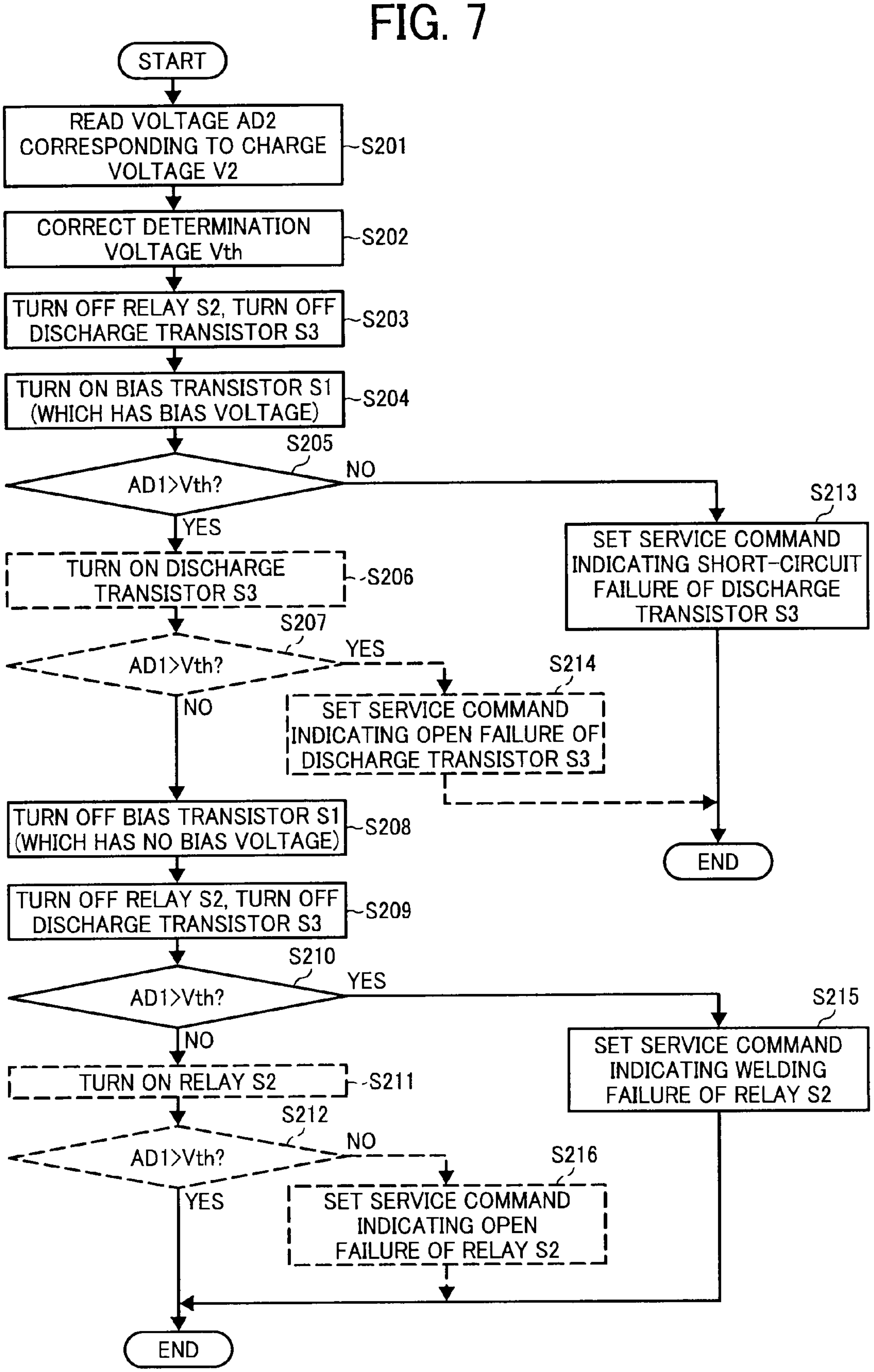
FIG. 7 is a flowchart of a method of determining the quality of the relay and the discharge transistor.

A method of determining the quality of the relay S2 and the discharge transistor S3 by the power control device 4 is explained below. FIG. 7 is a flowchart of the method of determining the quality of the relay S2 and the discharge transistor S3.

At first, a voltage AD2 corresponding to the charged voltage (output voltage) V2 is read by the A/D conversion input AD2 of the CPU 2 (Step S201). The determination voltage Vth corresponding to the drain voltage Vd of the discharge transistor S3 is corrected according to the read voltage AD2 (Step S202).

Next, the contact of the relay S2 and the discharge transistor S3 for electrical discharge are turned off (Step S203), and the bias transistor S1 that applies a bias voltage to the drain of the discharge transistor S3 is turned on (Step S204).

When the discharge transistor S3 is normally off in this state, a voltage equivalent to the bias voltage is produced at the junction "a", and thus the value of the A/D conversion input AD1 of the CPU 2 is higher (larger) than the determination voltage Vth.

However, when the discharge transistor S3 is not normally off, or is short-circuited (on), the current from the bias transistor S1 flows to the discharge transistor S3, and the voltage at the junction a decreases lower than the bias voltage. Thus, the value of the A/D conversion input AD1 of the CPU 2 becomes lower (smaller) than the determination voltage Vth.

It is also considered that the contact of the relay S2 may be short-circuited, however, the bias voltage is applied to the drain of the discharge transistor S3, and thus, there is no need to consider the short circuit in the contact of the relay S2 at this time.

The CPU 2 reads a value of the A/D conversion input AD1 and determines whether the value is larger than the determination voltage Vth (Step S205). When it is determined that the value of AD1 is not larger than the determination voltage Vth (NO at Step S205), the CPU 2 determines that a short-circuit failure occurs in the discharge transistor S3, sets a service command SC to that effect (Step S213), and ends the quality determination.

When it is determined that the value of the AD1 is larger than the determination voltage Vth (YES at Step S205), the CPU 2 determines that no short-circuit failure occurs in the discharge transistor S3.

Next, the discharge transistor S3 is turned on (Step S206).

When the discharge transistor S3 is normally on in this state, the current from the bias transistor S1 flows to the discharge transistor S3, and the voltage at the junction a decreases lower than the bias voltage. Thus, the value of the A/D conversion input AD1 of the CPU 2 is lower (smaller) than the determination voltage Vth.

However, when the discharge transistor S3 is not normally on, or is open (off), a voltage equivalent to the bias voltage is produced at the junction a, and thus the value of the A/D conversion input AD1 of the CPU 2 is higher (larger) than the determination voltage Vth.

It is also considered that the contact of the relay S2 may be short-circuited, however, the bias voltage is applied to the drain of the discharge transistor S3, and thus, there is no need to consider the short circuit in the contact of the relay S2 at this time.

The CPU 2 reads a value of the A/D conversion input AD1 and determines whether the value is larger than the determination voltage Vth (Step S207). When it is determined that the value of AD1 is larger than the determination voltage Vth (YES at Step S207), the CPU 2 determines that an open-circuit failure occurs in the discharge transistor S3, sets a service command SC to that effect (Step S214), and ends the quality determination.

When it is determined that the value of the AD1 is not larger than the determination voltage Vth (NO at Step S207), the CPU 2 determines that no open-circuit failure occurs in the discharge transistor S3.

However, it is secure enough to determine afterward whether the open-circuit failure occurs in the discharge transistor S3 by detecting malfunction in the flow of fixing-temperature control, and because of this, Steps S206, S207, and S214 may be omitted.

It is confirmed that there is no short circuit of the discharge transistor S3 in the flow so far. Next, the bias transistor S1 is turned off (Step S208), and further the contact of the relay S2 and the discharge transistor S3 are turned off (Step S209).

When the contact of the relay S2 is normally off in this state, a voltage due to the electric double-layer capacitor CP1 is not produced at the junction a. Consequently, the value of the A/D conversion input AD1 of the CPU 2 decreases lower (smaller) than the determination voltage Vth.

However, when the contact of the relay S2 is not normally off, or is short-circuited (on), a voltage due to the electric double-layer capacitor CP1 is produced at the junction a. Thus, the value of the A/D conversion input AD1 of the CPU 2 is higher (larger) than the determination voltage Vth.

The CPU 2 reads a value of the A/D conversion input AD1 and determines whether the value is larger than the determination voltage Vth (Step S210). When it is determined that the value of AD1 is larger than the determination voltage Vth (YES at Step S210), the CPU 2 determines that a soldering failure occurs in the contact of the relay S2, sets a service command SC to that effect (Step S215), and ends the quality determination.

When it is determined that the value of the AD1 is not larger than the determination voltage Vth (NO at Step S207), the CPU 2 determines that no soldering failure occurs in the contact of the relay S2.

Next, the contact of the relay S2 is turned on (Step S211).

When the contact of the relay S2 is normally on in this state, a voltage due to the electric double-layer capacitor CP1 is produced at the junction a. Thus, the value of the A/D conversion input AD1 of the CPU 2 becomes higher (larger) than the determination voltage Vth.

However, when the contact of the relay S2 is not normally on, or is open (off), the voltage due to the electric double-layer capacitor CP1 is not produced at the junction a. Thus, the value of the A/D conversion input AD1 of the CPU 2 becomes lower (smaller) than the determination voltage Vth.

The CPU 2 reads a value of the A/D conversion input AD1 and determines whether the value is larger than the determination voltage Vth (Step S212). When it is determined that the value of the AD1 is not larger than the determination voltage Vth (NO at Step S212), the CPU 2 determines that an open-circuit failure occurs in the contact of the relay S2, sets a service command SC to that effect (Step S216), and ends the quality determination.

When it is determined that the value of the AD1 is larger than the determination voltage Vth (YES at Step S212), the CPU 2 determines that the open-circuit failure does not occur in the contact of the relay S2. In this case, it is finally determined that the relay S2 and the discharge transistor S3 are good items.

However, it is secure enough to determine afterward whether the open-circuit failure occurs in the contact of the relay S2 by detecting malfunction in the flow of fixing-temperature control, and because of this, Steps S211, S212, and S216 may be omitted.

After the service commands SC are set, the corresponding processes are respectively executed. For example, if the service command SC is one indicating the short-circuit failure of the discharge transistor S3, the following processes are executed, such that turning on the contact of the relay S2 is inhibited and a message indicating the malfunction of the discharge transistor S3 is displayed on a display unit (not shown), or the message indicating the malfunction of the discharge transistor S3 is informed to the service section. Similarly, the required processes are performed on the other service commands SC, however, the processes are those generally performed in the digital copier, and thus explanation thereof is omitted.

Table 2 includes items as follows used in the method of determining the quality. More specifically, the items are combinations of on/off states of the bias transistor S1, the contact of the relay S2, and of the discharge transistor S3, a relationship between the value of AD1 and the determination voltage Vth, and a correlation between results of determination on the relay S2 and the discharge transistor S3. The method is implemented assuming that no failure may occur in the bias transistor S1 which is a transistor for signals.

TABLE 2

| On/Off state | | | | Results of determination | | |
|---|---|---|---|---|---|---|
| Bias transistor S1 | Relay S2 | Discharge transistor S3 | Relationship between AD1 and Vth | Relay S2 | Discharge transistor S3 | Contents of failure |
| on | off | Off | AD1 < Vth | — | Short circuit | Determined S3 is short-circuited |
| | | | AD1 > Vth | — | — | Determined as normal |

TABLE 2-continued

| On/Off state | | | | Results of determination | | |
|---|---|---|---|---|---|---|
| Bias transistor S1 | Relay S2 | Discharge transistor S3 | Relationship between AD1 and Vth | Relay S2 | Discharge transistor S3 | Contents of failure |
| on | off | On | AD1 < Vth | — | — | Determined as normal |
| | | | AD1 > Vth | — | Open | Determined S3 is not turned on |
| off | off | Off | AD1 < Vth | — | — | Determined as normal |
| | | | AD1 > Vth | Soldering | — | Determined S2 is soldered |
| off | on | off | AD1 < Vth | (Open) | (Short circuit) | Determined S2 is not turned on |
| | | | AD1 > Vth | — | — | Determined as normal |

As explained above, in the power control device according to the third embodiment, it is possible to correct the determination voltage used to determine whether malfunctions occur in the relay and the discharge transistor based on the charged voltage of the electric double-layer capacitor. Thus, it is possible to determine the malfunctions of the relay and the discharge transistor and the contents thereof without being affected by the charged voltage of the electric double-layer capacitor.

Furthermore, in the power control device according to the third embodiment, by detecting the change in voltage after A/D conversion, the malfunctions of the relay and the discharge transistor and the contents thereof can be determined, which allows widening of an application range, simplification of the quality determining circuit of the power control device, and minimization of the power control device and reduction in cost thereof.

In the first to the third embodiments, the power control devices using the electric double-layer capacitor as the capacitor are explained. However, even if a power control device uses a battery or any other capacitor, the same effect as that of the power control devices can be obtained if it is configured in the above manner.

In the first to the third embodiments, the power control devices that control power supply to the fixing heater HT2 are explained. However, even if a power control device controls power supply to any other electric power load requiring a large power, for example, to a lamp, the same effect as that of the power control devices can be obtained if it is configured in the above manner.

In the first to the third embodiments, the power control devices using the relay S2 that mechanically opens and closes are explained. However, even if a power control device uses a semiconductor device such as a thyristor that does not need to mechanically open and close, the same effect as that of the power control devices can be obtained if it is configured in the above manner.

As described above, according to an aspect of the present invention, it is possible to supply or stop the voltage between the relay and the semiconductor device (discharge transistor) which are the two switching circuits connected in series to the fixing heater that is an electric power load. Therefore, when the voltage is supplied or stopped and the switching circuits are thereby open or close respectively, a change in voltage at a particular portion of the power control device can be checked. Thus, it is possible to accurately detect or determine malfunctions of the relay and the semiconductor device (discharge transistor) and the contents of the malfunctions based on the change in voltage, the contents including the soldering failure of the contact of the relay, the open-circuit failure of the contact of the relay, the short-circuit failure of the discharge transistor, and the open-circuit failure of the discharge transistor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power control device comprising:

a first switching unit and a second switching unit connected in series to an electric power load;

a voltage supply unit that is connected between the first switching unit and the second switching unit and that supplies a voltage to the second switching unit;

a determining unit that determines an occurrence of a malfunction in at least one of the first switching unit and the second switching unit; and a third switching unit that is opened or closed based on a voltage between the first switching unit and the second switching unit, wherein in response to the first switching unit and the second switching unit being opened and the voltage supply unit supplying the voltage to the second switching unit, the determining unit determines whether an output of the third switching unit is a high logic level or a low logic level, and in response to a determination that the output of the third switching unit is the high logic level, the determining unit determines that a short-circuit failure occurred in the second switching unit.

2. The power control device according to claim 1, wherein the electric power load is a fixing heater, the first switching unit is a relay, the second switching unit is a discharge transistor, and the voltage supply unit is a circuit including a bias transistor and a diode.

3. The power control device according to claim 1, wherein the third switching unit includes a voltage converter connected to a junction between the first switching unit and the second switching unit and a transistor pulled up by a resistor, and the third switching unit is connected to a logic circuit.

4. The power control device according to claim 1, wherein in response to a determination that the output of the third switching unit is the low logic level, the determining unit further determines, after closing the second switching unit, whether the output of the third switching unit is the high logic level or the low logic level, and in response to a determination that the output of the third switching unit is the low logic level, the determining unit determines that an open-circuit failure occurred in the second switching unit.

5. A power control device comprising:

a first switching unit and a second switching unit connected in series to an electric power load;

a voltage supply unit that is connected between the first switching unit and the second switching unit and that supplies a voltage to the second switching unit;

a determining unit that determines an occurrence of a malfunction in at least one of the first switching unit and the second switching unit; and a third switching unit that is opened or closed based on a voltage between the first switching unit and the second switching unit, wherein in response to the first switching unit and the second switching unit being opened and the voltage supply unit supplying the voltage to the second switching unit, the determining unit determines whether an output of the third switching unit is a high logic level or a low logic level, in response to a determination that the output of the third switching unit is the low logic level, the determining unit further determines, after stopping the voltage supply by the voltage supply unit, whether the output of the third switching unit is the high logic level or the low logic level, and in response to a determination that the output of the third switching unit is the low logic level after stopping the voltage supply by the voltage supply unit, the determining unit determines that a soldering failure occurred in the first switching unit.

6. The power control device according to claim 5, wherein in response to a determination that the output of the third switching unit is the high logic level after stopping the voltage supply by the voltage supply unit, the determining unit further determines, after closing the first switching unit, whether the output of the third switching unit is the high logic level or the low logic level, and in response to a determination that the output of the third switching unit is the high logic level after closing the first switching unit, the determining unit determines that an open-circuit failure occurred in the first switching unit.

7. The power control device according to claim 1, further comprising a capacitor connected in series to the electric power load.

8. The power control device according to claim 1, further comprising a plurality of capacitors connected in series to the electric power load, wherein the voltage supply unit supplies the voltage to the second switching unit from any one of the capacitors.

9. The power control device according to claim 7, wherein the capacitor is an electric double-layer capacitor.

10. A power control device comprising:

a first switching unit and a second switching unit connected in series to an electric power load;

a voltage supply unit that is connected between the first switching unit and the second switching unit and that supplies a voltage to the second switching unit;

a determining unit that determines an occurrence of a malfunction in at least one of the first switching unit and the second switching unit;

a capacitor connected in series to the electric power load; and a voltage deciding unit that decides a determination voltage based on a charged voltage of the capacitor, wherein in response to the first switching unit and the second switching unit being opened and the voltage supply unit supplying the voltage to the second switching unit, the determining unit makes a first determination of whether the voltage between the first switching unit and the second switching unit is larger than the determination voltage, in response to a result of the first determination being that the voltage between the first switching unit and the second switching unit is larger than the determination voltage, the determining unit further makes a second determination, after stopping the voltage supply by the voltage supply unit, of whether the voltage between the first switching unit and the second switching unit is larger than the determination voltage, and in response to a result of the second determination being that the voltage between the first switching unit and the second switching unit is larger than the determination voltage, the determining unit determines that a soldering failure occurred in the first switching unit.

11. The power control device according to claim 10, wherein in response to the result of the first determination being that the voltage between the first switching unit and the second switching unit is smaller than the determination voltage, the determining unit determines that a short-circuit failure occurred in the second switching unit.

12. The power control device according to claim 10, wherein in response to the result of the first determination being that the voltage between the first switching unit and the second switching unit is larger than the determination voltage, the determining unit further determines, after closing the second switching unit, whether the voltage between the first switching unit and the second switching unit is larger than the determination voltage, and in response to a determination that the voltage between the first switching unit and the second switching unit is larger than the determination voltage after closing the second switching unit, the determining unit determines that an open-circuit failure occurred in the second switching unit.

13. The power control device according to claim 10, wherein in response to the result of the second determination being that the voltage between the first switching unit and the second switching unit is not larger than the determination voltage, the determining unit further determines, after closing the first switching unit, whether the voltage between the first switching unit and the second switching unit is larger than the determination voltage, and in response to a determination that the voltage between the first switching unit and the second switching unit is not larger than the determination voltage after closing the first switching unit, the determining unit determines that an open-circuit failure occurred in the first switching unit.

14. The power control device according to claim 10, further comprising:

a voltage changing unit that changes a voltage between the first switching unit and the second switching unit;

a first analog-to-digital converting unit that analog-to-digital converts the voltage changed by the voltage changing unit;

a charged-voltage changing unit that changes a charged voltage of the capacitor; and a second analog-to-digital converting unit that analog-to-digital converts the charged voltage changed by the charged-voltage changing unit, wherein the voltage deciding unit decides the determination voltage based on the charged voltage of the capacitor analog-to-digital converted by the second analog-to-digital converting unit, and the determining unit determines whether the voltage between the first switching unit and the second switching unit analog-to-digital converted by the first analog-to-digital converter is larger than the determination voltage.

15. The power control device according to claim 10, wherein the capacitor is an electric double-layer capacitor.

16. An image forming apparatus comprising:

an image forming unit; and a power control device including a first switching unit and a second switching unit connected in series to an electric power load, a voltage supply unit that is connected between the first switching unit and the second switching unit and that supplies a voltage to the second switching unit, a determining unit that determines an occurrence of a malfunction in at least one of the first switching unit and the second switching unit, and a third switching unit that is opened or closed based on a voltage between the first switching unit and the second switching unit, wherein in response to the first switching unit and the second switching unit being opened and the voltage supply unit supplying the voltage to the second switching unit, the determining unit determines whether an output of the third switching unit is a high logic level or a low logic level, and in response to a determination that the output of the third switching unit is the high logic level, the determining unit determines that a short-circuit failure occurred in the second switching unit.

17. An image forming apparatus comprising:

an image forming unit; and a power control device including a first switching unit and a second switching unit connected in series to an electric power load, a voltage supply unit that is connected between the first switching unit and the second switching unit and the supplies a voltage to the second switching unit, a determining unit that determines an occurrence of a malfunction in at least one of the first switching unit and the second switching unit, and a third switching unit that is opened or closed based on a voltage between the first switching unit and the second switching unit, wherein in response to the first switching unit and the second switching unit being opened and the voltage supply unit supplying the voltage to the second switching unit, the determining unit determines whether an output of the third switching unit is a high logic level or a low logic level, in response to a determination that the output of the third switching unit is the low logic level, the determining unit further determines, after stopping the voltage supply by the voltage supply unit, whether the output of the third switching unit is the high logic level or the low logic level, and in response to a determination that the output of the third switching unit is the low logic level, the determining unit determines that a soldering failure occurred in the first switching unit.

18. An image forming apparatus comprising:

an image forming unit; and a power control device including a first switching unit and a second switching unit connected in series to an electric power load, a voltage supply unit that is connected between the first switching unit and the second switching unit and that supplies a voltage to the second switching unit, a determining unit that determines an occurrence of a malfunction in at least one of the first switching unit and the second switching unit, a capacitor connected in series to the electric power load, and a voltage deciding unit that decides a determination voltage based on a charged voltage of the capacitor, wherein in response to the first switching unit and the second switching unit being opened and the voltage supply unit supplying the voltage to the second switching unit, the determining unit determines whether the voltage between the first switching unit and the second switching unit is larger than the determination voltage, in response to a determination that the voltage between the first switching unit and the second switching unit is larger than the determination voltage, the determining unit further determines, after stopping the voltage supply by the voltage supply unit, whether the voltage between the first switching unit and the second switching unit is larger than the determination voltage, and in response to a determination that the voltage between the first switching unit and the second switching unit is larger than the determination voltage, the determining unit determines that a soldering failure occurred in the first switching unit.

* * * * *